United States Patent [19]

Lindner

[11] Patent Number: 5,370,522

[45] Date of Patent: Dec. 6, 1994

[54] INJECTION VALVE FOR A VACUUM WAX INJECTION INSTALLATION

[76] Inventor: Arno Lindner, Diefenbachstrasse 13, D-8000 München 71, Germany

[21] Appl. No.: 74,607

[22] Filed: Jun. 11, 1993

[30] Foreign Application Priority Data

Jun. 25, 1992 [DE] Germany ............ 9208262[U]

[51] Int. Cl.$^5$ ............................... B29C 45/23
[52] U.S. Cl. ....................... 425/546; 137/625.26; 137/625.68; 251/297; 425/562; 425/DIG. 60
[58] Field of Search ........ 425/562, 563, 564, DIG. 60, 425/546; 137/625.26, 625.68; 251/297

[56] References Cited

U.S. PATENT DOCUMENTS

| 2,602,189 | 7/1952 | Finelt ..................... 425/563 |
| 2,872,705 | 2/1959 | Labarre ................... 425/564 |
| 3,070,126 | 12/1962 | Schneider ............... 137/637.2 |
| 3,910,466 | 10/1975 | Collar .................... 137/625.68 |
| 4,685,881 | 8/1987 | Sasaki .................... 425/564 |
| 4,840,198 | 6/1989 | Ott ........................ 137/625.26 |
| 5,101,858 | 4/1992 | Klotz ..................... 425/564 |

FOREIGN PATENT DOCUMENTS

| 245141 | 2/1966 | Austria . |
| 2016072 | 10/1970 | Germany . |
| 2023721 | 11/1971 | Germany . |
| 8026599U1 | 1/1981 | Germany . |
| 3334047C1 | 2/1985 | Germany . |
| 3403245A1 | 8/1985 | Germany . |
| 3005130C2 | 5/1987 | Germany . |
| 3727640 | 2/1988 | Germany . |
| 662755 | 10/1987 | Switzerland . |
| 497901 | 12/1938 | United Kingdom ........... 137/625.26 |
| 1005215 | 9/1965 | United Kingdom . |

WO91/16139 10/1991 WIPO .

OTHER PUBLICATIONS

Patent Abstracts of Japan, vol. 014, No. 536, Nov. 27, 1990.
Patent Abstracts of Japan, vol. 006, No. 157, Aug. 18, 1982.
Patent Abstracts of Japan, vol. 10, No. 286, Nov. 27, 1986.
Patent Abstracts of Japan, vol. 013, No. 177, Apr. 26, 1989.

Primary Examiner—Jay H. Woo
Assistant Examiner—Robert B. Davis
Attorney, Agent, or Firm—Nikaido, Marmelstein, Murray & Oram

[57] ABSTRACT

An injection valve for a vacuum wax injection installation for selectively communicating a mold into which wax is to be injected with a chamber with a vacuum and a chamber with liquid wax in the vacuum wax injection installation includes a main valve body and a tubular member which is arranged slidably in the main valve body between a valve-closed position, an evacuation position and a wax injection position. One end of the tubular member carries a connecting element against which the mold can be pressed while the opposite end of the tubular member is closed. The tubular member has lateral openings providing a communication between the connecting element and first the vacuum chamber and then the wax-filled chamber as the tubular member is progressively pushed into the main valve body from the valve-closed position, whereby firstly the mold is evacuated and then wax is injected into the mold.

12 Claims, 1 Drawing Sheet

INJECTION VALVE FOR A VACUUM WAX INJECTION INSTALLATION

BACKGROUND OF THE INVENTION

The present invention concerns an injection valve for a vacuum wax injection installation.

The vacuum wax injection process involves the production of a wax mold by filling a suitable hollow rubber mold with wax which then hardens in the rubber mold. In order to prevent the formation of air bubbles in the mold, the hollow rubber mold is evacuated prior to the injection of the wax into the mold, by the application of a reduced pressure to the rubber mold.

When carrying out that process in a vacuum wax injection installation therefore, the installation includes an injection valve which serves to communicate a mold into which wax is to be injected firstly with a chamber providing a vacuum and then with a chamber containing liquid wax. The valve must have a valve-closed position, an evacuation position for evacuation of the mold, and a wax injection position. The valve, from the structural point of view, further has a connecting element against which the hollow rubber mold can be sealingly pressed for the evacuation and the wax-injection phases.

Hitherto such injection valves for vacuum wax injection installations have been of an extremely complicated configuration, usually comprising various electronic, mechanical or similar components for producing the operating procedure involved (evacuation of the mold, interruption of the applied vacuum and injection of the wax). Injection valves of this kind, but of a simpler design configuration, tended to be highly complicated to operate as, at the same time as the hollow rubber mold being pressed against the connecting element, the various operating phases involved had to be successively triggered off by way of a control member such as a lever.

SUMMARY OF THE INVENTION

An object of the present invention is to provide an injection valve of a simple design configuration for a vacuum wax injection installation which is at the same time extremely simple to operate.

Another object of the present invention is to provide an injection valve for a vacuum wax injection installation which presents a high degree of structural simplicity and user-friendliness combined with operational reliability.

In accordance with the present invention the foregoing and other objects are achieved by an injection valve for a vacuum wax injection installation for communicating a mold into which wax is to be injected selectively with a first space for providing a vacuum and a second space for providing liquid wax in the vacuum wax injection installation, the valve including a main valve body and a tubular member having a first closed end and a second end and slidable in the main valve body and having at least one lateral opening. A connecting member is fixed to the tubular member at its second end and is adapted to co-operate sealingly with a said mold. The tubular member is displaceable inwardly relative to the main valve body from a valve-closed position firstly to an evacuation position in which said connecting member is communicated by way of the lateral opening with the first space and then a wax injection position in which the connecting member is communicated by way of the at least one lateral opening with the second space.

In a preferred feature the valve is mounted in an outside wall of the second space which is in use filled with liquid wax while provided in the outside wall is a duct which is communicated with the vacuum in the first space. That prevents the wax from hardening by virtue of having to cover long flow paths, before it can pass into the hollow rubber mold.

In a further preferred feature the valve includes a spring means adapted to bias the tubular member towards the closed condition of the valve. The spring means is preferably in the form of a coil spring arranged around the tubular member between the main valve body and a portion of the connecting member, which projects outwardly beyond the tubular member.

In another preferred feature of the invention the tubular member passes through the main valve body and at its first end, in the interior of the space which is filled with wax, has at its first end an enlarged portion having a transverse dimension such as a diameter which is larger than the transverse dimension such as a diameter at which the tubular member is guided in the main valve body.

The enlarged portion on the tubular member is adapted in the closed condition of the valve to bear against the main valve body of the valve, while at least one of the enlarged portion and the co-operating portion of the main valve body has a sealing means at the mutual contact location. That design configuration can ensure that liquid wax does not seep out between the tubular member and the main valve body in which it is slidable, when the valve is in the rest or closed condition, by flowing through the clearance which must necessarily be provided between the tubular member and the main valve body in order for the tubular member to be slidable in the latter.

In another preferred feature of the invention the valve includes a retaining means for holding the tubular member in the evacuation position. Thus the tubular member may have a recess on its outside, and the valve body may further include a retaining means adapted to engage into the recess when the tubular member is in the evacuation position. That further facilitates operation of the injection valve as, when the valve is being pressed into the main valve body from the valve-closed position, it is possible to feel precisely when the evacuation position has been reached by virtue of the retaining means engaging into the recess. In addition that makes it possible for the rubber mold to be acted upon by vacuum for a period of any desired length, in order thereby to achieve evacuation of the mold to the desired extent.

In a preferred feature of that arrangement the recess is in the form of an annular groove in the tubular member and the retaining means comprises a ball and a coil spring loading the ball towards the groove. The recess or annular groove which thus extends around the peripheral surface of the tubular member may be of a semicircular configuration in cross-section.

Further objects, features and advantages of the present invention will be apparent from the following description of a preferred embodiment.

DESCRIPTION OF THE PREFERRED EMBODIMENT

Figure 1:
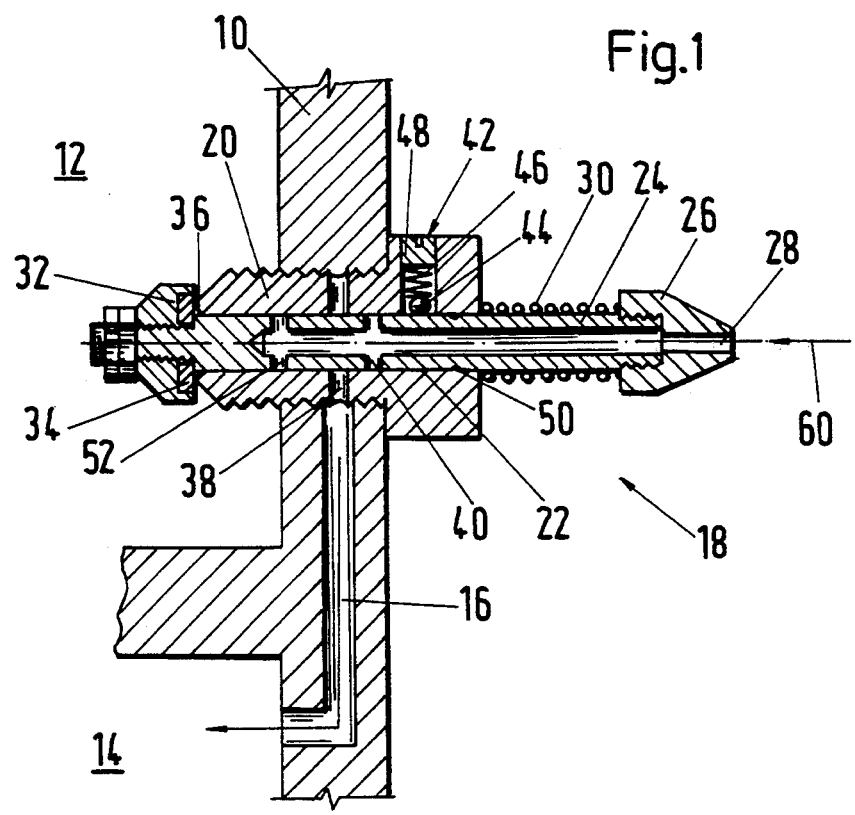
FIG. 1 is a sectional view of an injection valve according to the invention for a vacuum wax injection installation in the rest or closed condition of the valve.

Referring firstly to FIG. 1, shown therein is an injection valve according to the invention, as generally indicated by reference numeral 18, for a vacuum wax injection installation. The injection valve 18 is disposed in an outside wall 10 of the wax container 12 of the vacuum wax injection installation. The wax container 12 thus provides a space or chamber which in use of the installation contains liquid wax. Reference numeral 14 identifies a vacuum tank which in this installation is disposed beneath the wax container 12. The vacuum tank 14 is communicated with the injection valve 18 according to the invention by way of a duct 16 which extends in the outside wall 10 of the installation. As can be seen from FIG. 1, the injection valve 18 is preferably disposed in the lower region of the wax container 12.

The injection valve 18 includes a main valve body 20 which is fixed, for example by screwing, in the wall 10 of the wax container 12. The main valve body 20 bears with a side surface of an enlarged outer portion thereof against the outside surface of the outside wall 10 of the installation. The main valve body has a horizontal bore 22 extending therethrough, in which a tubular member 24 of suitable outside diameter is horizontally slidably and sealingly guided. The tubular member 24 is closed at its end which is towards the left in FIG. 1. The tubular member 24 carries at its end which is towards the right in FIG. 1 a connecting member 26 which tapers towards a pointed configuration towards the right in FIG. 1, the connecting member 26 being screwed on to the end of the tubular member 24 and its tip having an opening 28 which is communicated with the interior of the tubular member 24. The connecting member 26 corresponds to the usual connecting members for use in conjunction with hollow rubber molds employed in the goldsmith art. In use of the installation the rubber mold is pressed against the connecting member 26.

Arranged between the rearward face of the connecting member 26, which thus faces towards the left in FIG. 1 and which is defined by the portion of the connecting member 26 which projects radially outwardly beyond the outside peripheral surface of the tubular member 24, and the front side of the main valve body 20, which thus faces towards the right in FIG. 1, is a spring in the form of a coil spring 30 which surrounds the tubular member 24. The coil spring 30 is always in a biased condition and thus holds the tubular member 24 in a defined position, which is the valve-closed position, in the rest condition of the valve, as shown in FIG. 1.

At the end of the tubular member which is towards the left in FIG. 1 and which is therefore the closed end of the tubular member 24, a sealing element as indicated at 32 is screwed on to the end portion of the tubular member 24, to provide a suitable abutment to prevent the tubular member 24 from being displaced entirely out of the main valve body 20 towards the right in FIG. 1, under the force of the coil spring 30. The sealing element 32 carries a seal 34 which, in the valve-closed position shown in FIG. 1, is pressed by means of the force of the coil spring 30 against a valve seat 36 disposed at the inward end, which is towards the left in FIG. 1, of the main valve body 20. That provides for reliable sealing of the wax container 12 relative to the exterior and relative to the valve 18.

Also provided in the main valve body 20 are openings 38 by way of which the vacuum duct 16 is communicated with the internal space in the tubular member 24. To provide that communication, the tubular member 24 likewise has one or more lateral openings 40 which communicate with the internal space in the tubular member 24 and which, in the evacuation position shown in FIG. 2, came into alignment with the openings 38 in the main valve body 20 and in that way provide a communication between the rubber mold fitted to the connecting member 26 and the vacuum in the vacuum tank 14. It will be seen from a comparison between FIGS. 1 and 2 therefore that the valve is moved into the evacuation position for vacuum to be applied from the vacuum tank 14 through the duct 16, the openings 38, the openings 40, the interior of the tubular member 24 and the opening 28 in the connecting element 26, to the interior of the rubber mold (not shown), by displacement of the tubular member 24 inwardly of the main valve body 20 from the FIG. 1 position into the FIG. 2 position.

Provided in the external enlarged portion of the main valve body 20 is a ball-type retaining means indicated generally at 42. It includes a ball 44 which is urged towards the tubular member 24 by a coil spring 46. For the purposes of fixing the entire retaining means 42 and prestressing the spring 46, a grub screw or setscrew 48 is screwed in the bore in the main valve body 20, which is provided for accommodating the ball 44 and the spring 46 and which is at least substantially normal to the tubular member 24.

Figure 2:
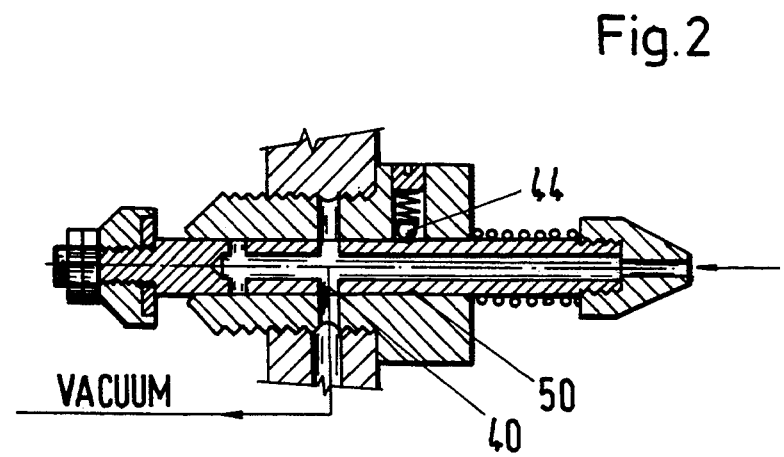
FIG. 2 is a view of the injection valve shown in FIG. 1 in the evacuation position.

Provided on the outside peripheral surface of the tubular member 24 is a peripherally extending recess in the form of a groove 50 of semicircular cross-sectional configuration, the spacing of which relative to the openings 40 is so selected that, in the position shown in FIG. 2, on the one hand the openings 40 in the tubular member 24 are in alignment with the openings 38 in the main valve body 20 and at the same time on the other hand the ball 44 of the retaining means 42 engages into the groove 50.

Figure 3:
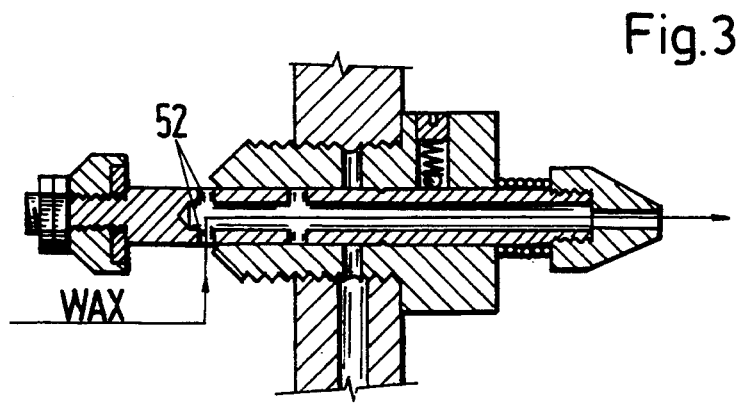
FIG. 3 is a view of the injection valve shown in FIG. 1 in the wax injection position.

Provided in the tubular member 24 near the closed end of the tubular member 24 is at least one or more further lateral openings as indicated at 52 in FIG. 1. When the tubular member 24 is in the position of having been pushed entirely into the main valve body 20, as illustrated in FIG. 3, the openings 52 have been pushed beyond the inward end 36 of the main valve body 20. In the FIG. 3 position therefore the openings 52 open into the space or chamber 12, which is filled with wax, in the wax container. Those openings thus permit the wax to pass into the interior of the tubular member 24 and thus through the connecting member 26 into the mold which was evacuated when the valve was in the FIG. 2 position.

The structure of the present embodiment of the valve according to the invention having been described, the operating procedure involved therewith will now be described as follows:

FIG. 1 shows the valve in its rest or closed condition. In that condition both the vacuum tank 14 and the wax container 12 are sealingly closed by the valve 18 being in its closed position. To initiate an injection procedure, a hollow rubber mold is now fitted to the connecting member 26. When that happens, the mold is urged against the connecting member 26 in the direction indicated by the arrow 60. As a result, the entire tubular member 24 is moved inwardly of the main valve body 20 against the force of the compression spring 30 until the valve reaches the condition shown in FIG. 2. When the tubular member 24 is in that position the retaining ball 42 engages into the recess 50. In that position the air in the rubber mold is now evacuated therefrom as in that position, as described above, there is a communication between the connecting member 26 and thus the interior of the mold fitted thereto, and the vacuum tank 14.

When the pressure applied to the connecting member 26 and thus the tubular member 24 is further increased, the frictional retaining resistance of the retaining means 42 and the spring force of the coil spring 30 are overcome and the tubular member 24 is pushed entirely into the main valve body 20 so that the valve assumes the condition shown in FIG. 3 in which the wax in the wax container 12 is now injected into the mold as the openings 52 now extend into the wax-filled chamber 12. When, after termination of the wax injection phase, the rubber mold is removed from the connecting member 26, the latter moves rapidly forwardly again, that is to say towards the right in the drawing, under the force of the spring 30, and resumes the position shown in FIG. 1 so that both the wax container 12 and the vacuum tank 14 are closed again. That therefore terminates a working cycle of the injection valve.

It will be appreciated that the above-described embodiment of the valve according to the invention has been set forth solely by way of example and illustration of the principles of the invention and that various modifications and alterations may be made therein without thereby departing from the spirit and scope of the invention.

What is claimed is:

1. An injection valve for a vacuum wax injection installation for communicating a mold into which wax is to be injected selectively with a first space for providing a vacuum and a second space for providing liquid wax in the vacuum wax injection installation, the valve including a main valve body, a tubular member having a first closed end and a second end and slidable in the main valve body and having at least one lateral opening, and a connecting member for attaching said valve to the mold, said connecting member located on the tubular member at its second end and which cooperates sealingly with said mold, the tubular member being displaceable inwardly relative to the main valve body from a valve-closed position firstly to an evacuation position in which said connecting member is communicated through said lateral opening with said first space and then a wax injection position in which said connecting member is communicated through said at least one lateral opening with said second space.

2. A valve as set forth in claim 1 including spring means biasing the tubular member towards the closed position.

3. A valve as set forth in claim 2 wherein said spring means is a coil spring arranged around the tubular member between the main valve body and a portion of the connecting member which projects outwardly beyond the tubular member.

4. A valve as set forth in claim 1 wherein the tubular member passes through the main valve body and at its first end has an enlarged portion having a transverse dimension which is larger than the transverse dimension at which the tubular member is guided in the main valve body.

5. A valve as set forth in claim 4, wherein said enlarged portion on the tubular member bears against the main valve body in the closed position of the valve and wherein at least one of the enlarged portion and the co-operating portion of the main valve body has a sealing means at their mutual contact location.

6. A valve as set forth in claim 1, wherein the tubular member has a recess on its outside, and further including a retaining means engaging said recess when the tubular member is in the evacuation position.

7. A valve as set forth in claim 6 wherein the recess is in the form of an annular groove in the tubular member and the retaining means comprises a ball and a coil spring loading the ball towards the groove.

8. A valve as set forth in claim 1, said valve being configured to be mounted in a wall which separates the first space from the second space and wherein said valve communicates with said first space through a duct in said wall.

9. In a vacuum wax injection installation having a first means for providing a reduced pressure and a second means for providing a supply of liquid wax, an injection valve for selectively and successively communicating a mold into which wax is to be injected with said first and second means, the valve including: a main valve body having an elongate opening therein; an elongate valve member having a duct extending axially therethrough and first and second lateral duct means communicating said axial duct with the lateral outside of said valve member, said first and second duct means being spaced from each other in the axial direction of said valve member, the valve member being axially slidably carried in said elongate opening in the main valve body and having first and second ends, the axial duct being closed at said first end and the second end projecting out of said main valve body, the valve member being slidable inwardly of said main valve body successively from a valve-closed rest position to an evacuation position in which it establishes a communication between said axial duct and said first means through said first duct means and then to a wax injection position in which it establishes a communication between said axial duct and said second means through said second duct means; and a connecting member at said second end of said valve member sealingly connecting said axial duct with said mold.

10. An installation as set forth in claim 9 wherein said first means is a vacuum tank and said second means is a container for wax.

11. An installation as set forth in claim 9 wherein said connecting member comes into sealing contact with said mold by said mold being pressed against said connecting member.

12. An installation as set forth in claim 9 and further including a spring means urging said valve member towards said valve-closed position.

* * * * *